United States Patent [19]

Schütz et al.

[11] Patent Number: 4,544,739
[45] Date of Patent: Oct. 1, 1985

[54] FIBRE-REACTIVE CHROMIUM COMPLEX AZO-AZOMETHINE DYES

[75] Inventors: Hans U. Schütz, Basel; Arthur Bühler, Rheinfelden, both of Switzerland

[73] Assignee: Ciba-Geigy Corporation, Ardsley, N.Y.

[21] Appl. No.: 425,595

[22] Filed: Sep. 28, 1982

Related U.S. Application Data

[62] Division of Ser. No. 196,423, Oct. 14, 1980, abandoned.

[51] Int. Cl.$^4$ .................. C09B 62/012; C09B 62/095; C09B 62/255; C09B 62/477
[52] U.S. Cl. .................................... 534/619; 534/622; 534/623; 534/627; 534/643; 534/695; 534/696; 534/697; 534/725; 534/738; 534/792; 534/836; 534/837; 534/859
[58] Field of Search ............... 260/145 A, 145 B, 147, 260/149, 150, 151; 534/695, 622, 627, 619

[56] References Cited

U.S. PATENT DOCUMENTS

| | | | |
|---|---|---|---|
| 3,375,240 | 3/1968 | Beffa et al. | 260/145 |
| 3,412,081 | 11/1968 | Ackermann | 260/145 B |
| 3,544,546 | 12/1970 | Crabtree et al. | 260/145 B |
| 3,625,935 | 12/1971 | Back et al. | 260/145 A |
| 4,086,223 | 4/1978 | Steiner et al. | 260/151 |
| 4,311,641 | 1/1982 | Beffa | 260/145 A |

FOREIGN PATENT DOCUMENTS 1387976 3/1975 United Kingdom ............... 534/696

*Primary Examiner*—Floyd D. Higel
*Attorney, Agent, or Firm*—Edward McC. Roberts; Kevin T. Manfield; Irving M. Fishman

[57] ABSTRACT

Chromium complex dyes which, in the form of the free acid, have the formula

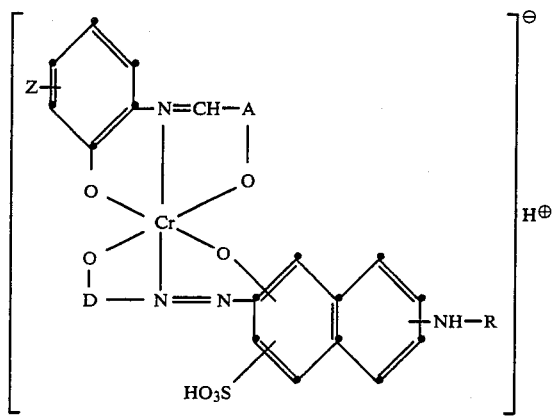

wherein Z is hydrogen, nitro, chlorine or naphthylazo or phenylazo, wherein naphthyl or phenyl is unsubstituted or substituted by nitro, chlorine, bromine, $C_{1-5}$-alkyl or $C_{1-5}$-alkoxy, A is naphthyl or phenyl containing the oxygen atom in o-position to the azomethine and wherein naphthyl or phenyl is unsubstituted or substituted by $C_{1-5}$-alkyl, halogen or naphthylazo or phenylazo wherein naphthyl or phenyl is unsubstituted or substituted by nitro, chlorine, bromine, $C_{1-5}$-alkyl or $C_{1-5}$-alkoxy, D is sulfophenyl which is unsubstituted or substituted by nitro or chlorine, or sulfonaphthyl which is unsubstituted or substituted by nitro, and is bonded to the azo group in the ortho-position to the oxygen atom and R is chloroacetyl, bromoacetyl, α-chloroacryloyl, α-bromoacryloyl, α,β-dichloropropionyl, α,β-dibromopropionyl, 5-chloro-2,4-difluoropyrimidyl or 2-chloro- or 2-fluorotriazin-6-yl substituted in 4-position by substituted or unsubstituted amino, free or etherified hydroxy or mercapto. These dyes are obtained by chroming the corresponding o,o'-dihydrokyazo compounds and o,o'-dihydroxyazomethine compounds, the reactive radical R being introduced by acylation before or after the chroming. They are suitable for dyeing natural or synthetic polyamide material.

3 Claims, No Drawings

FIBRE-REACTIVE CHROMIUM COMPLEX AZO-AZOMETHINE DYES

This is a divisional of application Ser. No. 196,423 filed on Oct. 14, 1980, now abandoned.

The present invention relates to chromium complex dyes which, in the form of the free acid, have the formula

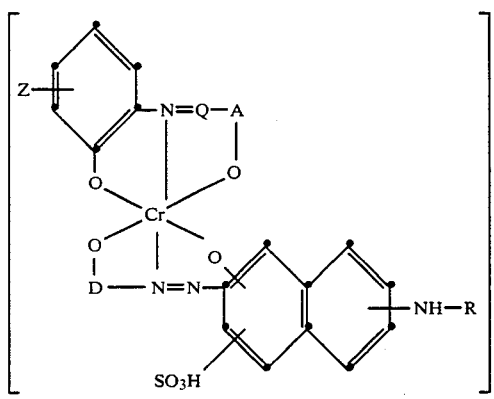

wherein Z is hydrogen, nitro, chlorine, or an arylazo group, Q is a nitrogen atom or the CH— group, A is the radical of a coupling component which couples in the ortho-position to the oxygen atom if Q is a nitrogen atom, or is the radical of an o-hydroxyaldehyde if Q is the CH— group, D is a sulfophenyl radical which can be substituted by nitro or chlorine, or a sulfonaphthyl radical which can be substituted by nitro and is bonded to the azo group in the ortho-position to the oxygen atom, and R is a reactive group.

These dyes are advantageously isolated in the form of their salts, especially alkali metal salts, e.g. lithium, potassium and, preferably, sodium salts, or also in the form of ammonium salts or salts of organic amines with positively charged nitrogen atom. For the sake of simplicity, however, they are always represented throughout this specification as being in the form of the free acid.

The term "aryl" herein denotes a naphthyl or, in particular, phenyl group, which can be substituted by the customary non-ionic substituents of dyes, e.g. nitro, chlorine, bromine, low molecular alkyl and low molecular alkoxy. Radicals qualified by the term "low molecular" contain 1 to 5 carbon atoms.

The dyes of the formula (1) are obtained by reacting one of the compounds of the formulae

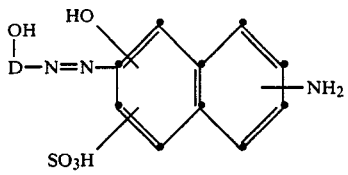

and

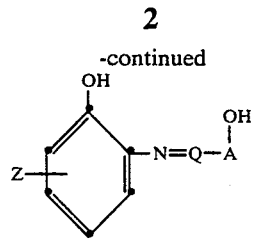

with a chromium donor to form the 1:1 chromium complex, and converting this latter with the other of the two compounds above into the 1:2 chromium complex, and, before or after the chroming, reacting the compound of the formula (2) with an acylating agent which introduces the radical R, with the proviso that, if Q is the CH— group, the 1:1 chromium complex of the compound of the formula (2) can also be reacted with a mixture of the amine of the formula

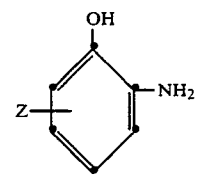

and the aldehyde of the formula

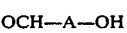

OCH—A—OH        (5)

instead of with the azomethine of the formula (3).

It is preferred to prepare first the 1:1 chromium complex of the compound of the formula (2), then to add thereto the compound of the formula (3) or the mixture of the compounds of the formulae (4) and (5), and to acylate the resultant 1:2 chromium complex.

The production of these chromium complexes is effected by methods which are known per se. For example, the 1:1 chromium complex of the compound of the formula (2) is prepared by reacting the metal-free compound, in acid medium, with a salt of trivalent chromium such as chromium chloride, chromium fluoride or chromium sulfate, if desired in the presence of a solubility promoter or a chroming catalyst, e.g. an alcohol or a hydroxycarboxylic acid. The 1:1 complex is then reacted, in neutral to weakly acid medium, with a compound of the formula (3) or with the mixture of the compounds of the formulae (4) and (5).

Suitable diazo components of compounds of the formula (2) are: 2-amino-1-hydroxybenzene-4- or -5-sulfonic acid, 4-nitro-2-amino-1-hydroxybenzene-5- or -6-sulfonic acid, 5- or 6-nitro-2-amino-1-hydroxybenzene-4-sulfonic acid, 6-chloro-2-amino-1-hydroxybenzene-4-sulfonic acid, 1-amino-2-hydroxynaphthalene-4-sulfonic acid, and 1-amino-2-hydroxynaphthalene-6-nitro-4-sulfonic acid.

Coupling components employed are aminonaphthol-sulfonic acids such as 1-amino-5-naphthol-7-sulfonic acid, 1-amino-8-naphthol-4-sulfonic acid or 2-amino-6-naphthol-8-sulfonic acid and, preferably, 2-amino-8-naphthol-6-sulfonic acid and 2-amino-5-naphthol-7-sulfonic acid.

Suitable diazo components of compounds of the formula (3), and suitable amines of the formula (4), are e.g.: 2-amino-1-hydroxybenzene, 4- or 5-nitro-2-amino-1-hydroxybenzene, 4-chloro-2-amino-1-hydroxybenzene, 4-(o-methoxyphenylazo)-2-amino-1-hydroxybenzene,
4-(p-chlorophenylazo)-2-amino-1-hydroxybenzene or
4-(p-nitrophenylazo)-2-amino-1-hydroxybenzene.

The radical A is preferably derived from the following groups of coupling components:

5-pyrazolones which, in the 1-position, contain hydrogen or a phenyl or naphthyl radical which can be substituted by chlorine, nitro or low molecular alkyl or alkoxy groups;

acetoacetarylides, especially acetoacetanilides, which can be substituted in the aniline nucleus by chlorine, bromine, low molecular alkyl or alkoxy;

naphthols which can be substituted by chlorine or non-reactive acylamino groups;

phenols which are substituted by non-reactive acylamino groups and/or by alkyl groups containing preferably 1 to 5 carbon atoms or dialkylamino groups containing 1 to 5 carbon atoms in the alkyl moieties, and which couple in the ortho-position to the hydroxyl group.

Suitable non-reactive acylamino groups are in particular low molecular alkanoyl- and alkoxycarbonylamino groups as well as the benzoylamino group.

Examples of such coupling components are: 2-naphthol, 1,3- or 1,5-dihydroxynaphthalene, 1-naphthol, 1-acetylamino-7-naphthol, 1-propionylamino-7-naphthol, 1-carbomethoxyamino-7-naphthol, 1-carboethoxyamino-7-naphthol, 1-carbopropoxyamino-7-naphthol, 5,8-dichloro-1-naphthol, 5-chloro-1-naphthol, 1-phenyl-3-methylpyrazol-5-one, 1-(2'-, 3'- or 4'-methylphenyl)-3-methylpyrazol-5-one, 1-(2'- or 4'-methoxyphenyl)-3-methylpyrazol-5-one, 1-(2'-, 3'- or 4'-chlorophenyl)-3-methylpyrazol-5-one, 1-(2'-, 3'- or 4'-nitrophenyl)-3-methylpyrazol-5-one, 1-(2'-, 5'- or 3'-, 4'-dichlorophenyl)-3-methylpyrazol-5-one, acetoacetanilide, acetoacet-o-anisidide, acetoacet-o-toluidide, acetoacet-o-chloroanilide, acetoacet-m-xylidide, 4-methylphenol, 3-dialkylaminophenol, especially 3-dimethylamino- and 3-diethylaminophenol, 4-butylphenol, 4-amylphenol, especially 4-t-amylphenol, 2-isopropyl-4-methylphenol, 2- or 3-acetylamino-4-methylphenol, 2-methoxycarbonylamino-4-methylphenol, 2-ethoxycarbonylamino-4-methylphenol, 2,4-dimethylphenol and 3,4-dimethylphenol, 2,4-dioxyquinoline, rescorcinol.

Examples of suitable aldehydes of the formula (5) are: 2-hydroxynaphthaldehyde, 1-hydroxy-2-naphthaldehyde, 5-methyl-2-hydroxybenzaldehyde, 3,5-dimethyl-2-hydroxybenzaldehyde, 5-butyl-2-hydroxybenzaldehyde, 5-chloro- or 5-bromo-2-hydroxybenzaldehyde, as well as the corresponding aldehydes which are substituted in the 3- or especially 5-position by an arylazo group. An arylazo group is introduced into the above o-hydroxyaldehydes in conventional manner, by diazotising e.g. aniline, 4-nitroaniline, toluidine, 4-chloroaniline or α-naphthylamine, and coupling the diazotised compound to the aldehyde.

Suitable acylating agents which introduce the radical R are chloroacetyl chloride, bromoacetyl chloride, α,β-dichloro- or α,β-dibromopropionyl chloride, α-chloro- or α-bromoacryloyl chloride, fluoro-chloropyrimidines such as 5-chloro-2,4,6-trifluoropyrimidine, 2,4,6-trifluorotriazine, and fluorotriazine compounds of the formula

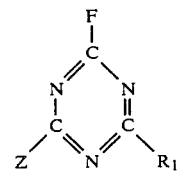

wherein Z is a removable radical, in particular a fluorine atom, and $R_1$ is a substituted or unsubstituted amino group or a free or etherified oxy or thio group, for example the $NH_2$ group, an amino group which is mono- or disubstituted by $C_1$–$C_4$ alkyl radicals; a $C_1$–$C_4$ alkoxy radical, a $C_1$–$C_4$ alkylmercapto group, phenylamino, mono- or disulfophenylamino, phenoxy, mono- or disulfophenyloxy.

Examples of such triazine compounds are: 2,6-difluoro-2-aminotriazine, 2,4-difluoro-6-methylaminotriazine, 2,4-difluoro-6-ethylaminotriazine, 2,4-difluoro-6-phenylaminotriazine, 2,6-difluoro-4-dimethylaminotriazine, 2,6-difluoro-4-methoxytriazine, 2,6-difluoro-4-(β-methoxyethoxy)-triazine, 2,6-difluoro-4-methylmercaptotriazine, 2,6-difluoro-4-phenylmercapto-triazine.

Preferred acylating agents are α,β-dibromopropionyl chloride and α-bromoacryloyl chloride.

Particularly interesting chromium complexes are those which, in the form of the free acid, have the formula

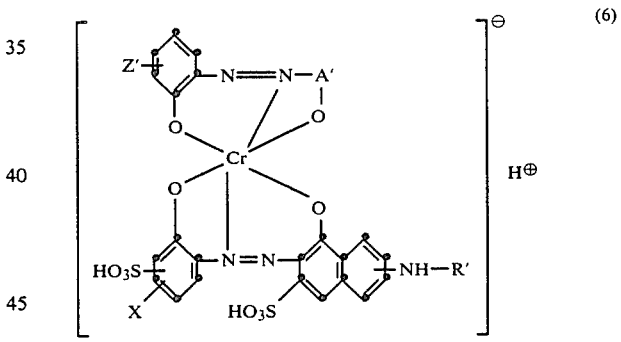

(6)

wherein Z' is chlorine or nitro, X is hydrogen, chlorine or nitro, R' is the α,β-dibromopropionyl radical or the α-bromoacryloyl radical, and A' is the radical of a 1-aryl-3-methylpyrazol-5-one, a β-naphthol radical or the radical of a phenol which couples in the ortho-position to the hydroxyl group and is substituted by low molecular alkyl or dialkylamino.

Especially preferred compounds within the group of compounds referred to above are those wherein A' is the radical of a 1-phenyl-3-methylpyrazol-5-one and each of X and Z' is nitro, as these give particularly good brown dyeings.

The radical of a 1-phenyl-3-methylpyrazol-5-one is in particular e.g. the 1-(4'-chlorophen-1'-yl)-3-methylpyrazol-5-one radical, the 1-(2'-chlorophenyl-1'-yl)-3-methylpyrazol-5-one radical, and the 1-phenyl-3-methylpyrazol-5-one radical which is unsubstituted in the phenyl nucleus.

A particularly valuable dye is that of the formula

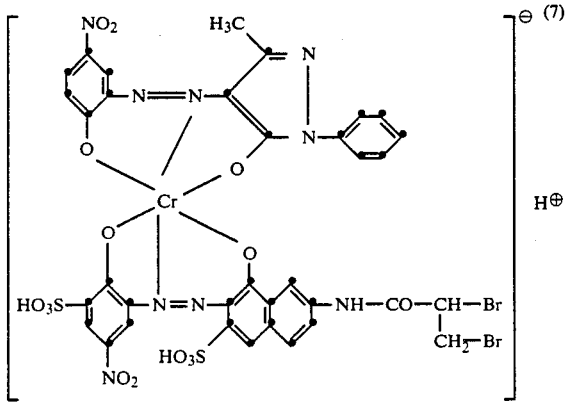

A further group of interesting dyes comprises those of the formula

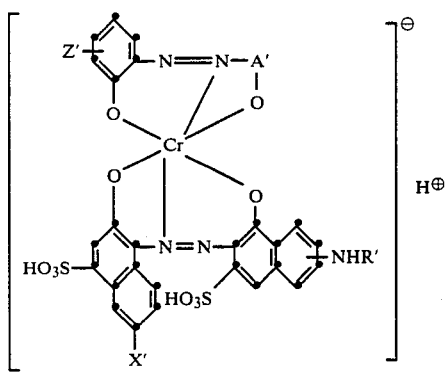

wherein Z' is chlorine or nitro, X' is hydrogen or nitro, R' is the α,β-dibromopropionyl radical or the α-bromoacryloyl radical, and A" is a β-naphthol radical, the radical of a 1-naphthol which can be mono- or di-substituted by chlorine, or the radical of a phenol which couples in the ortho-position to the hydroxyl group and is substituted by low molecular alkyl or, especially, dialkylamino. These dyes produce particularly good navy blue dyeings.

The dyes of the present invention are suitable for dyeing and printing natural or synthetic polyamides such as silk, synthetic polyamide and, in particular, wool. They produce level, brilliant, strong dyeings and have good fastness properties such as fastness to light and rubbing, and also, in particular, good wetfastness properties such as fastness to washing, fulling, perspiration, hot water, and moist heat. They exhaust readily and build up to deep, level dyeings.

The dyes which contain, as reactive radical, a fluorochloropyrimidine, chlorotriazine or fluorotriazine radical are especially suitable for dyeing and printing cellulosic material of fibrous structure such as linen, viscose staple fibre, regenerated cellulose and, in particular, cotton. They are especially suitable for dyeing by the pad-dyeing process, in which the goods are impregnated with aqueous, and, optionally, also salt-containing dye solutions, and the dyes are fixed after a treatment with alkali or in the presence of alkali, if desired with the application of heat.

It is advisable to rinse the dyeings and prints thoroughly with cold and hot water, optionally with the addition of an agent which acts as a dispersant and promotes the diffusion of non-fixed dye.

The invention is illustrated by the following Examples, in which parts and percentages are by weight.

EXAMPLE 1

48.9 parts of the 1:1 chromium complex of the monoazo dye obtained by coupling 2-aminophenol-4-sulfonic acid to 2-amino-8-naphthol-6-sulfonic acid in alkaline medium, and 33.9 parts of the monoazo dye obtained from 4-nitro-2-aminophenol and 1-phenyl-3-methyl-5-pyrazolone, are stirred in 500 parts of water for 3 hours at 80°–85° C. The dye solution is cooled to 50° C. and then 15 parts of sodium carbonate are added. The batch is stirred for 10 minutes, then cooled to 10°–15° C. with 200 parts of ice. With efficient stirring, 13.6 parts of 1,2-dibromopropionyl chloride are added dropwise in the course of about 1 hour and stirring is continued for 2 to 3 hours at room temperature. The dye of the formula

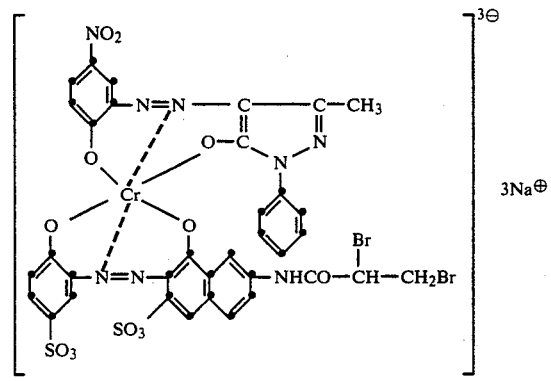

is precipitated with sodium chloride, collected by filtration, and dried. The resultant product is a water-soluble dark powder which dyes wool in reddish brown shades of excellent fastness properties.

Further dyes with similar properties are obtained in analogous manner by reacting the 1:1 chromium complexes of the monoazo compounds listed in column I of Table 1 with the metal-free azo compounds of column II and subsequently acylating the resultant 1:2 chromium complex with α,β-dibromopropionyl chloride. These products dye wool in the shades indicated in column III.

TABLE 1

| | I | II | III |
|---|---|---|---|
| 1 | 2-hydroxy-3-sulfo-5-nitrophenyl-azo-1-hydroxy-2-sulfo-6-amino-naphthalene (HO3S, OH, NO2, N=N, OH, SO3H, NH2) | 2-hydroxy-5-nitrophenyl-azo pyrazolone with phenyl, CH3, OH | brown |
| 2 | " | 2-hydroxy-5-chlorophenyl-azo pyrazolone with phenyl, CH3, OH | brown |
| 3 | " | 2-hydroxy-5-nitrophenyl-azo-2-hydroxynaphthalene | grey |
| 4 | 2-hydroxy-3-nitrophenyl-5-sulfo-azo-1-hydroxy-2-sulfo-6-amino-naphthalene (O2N, OH, N=N, OH, NH2, SO3H, SO3H) | 2-hydroxy-5-nitrophenyl-azo pyrazolone with phenyl, CH3, OH | brown |
| 5 | " | 2-hydroxy-5-nitrophenyl-azo-2-hydroxynaphthalene | grey |
| 6 | " | 2-hydroxy-4-nitrophenyl-azo-2-hydroxynaphthalene | grey |
| 7 | " | 2-hydroxy-5-chlorophenyl-azo-2-hydroxynaphthalene | grey |
| 8 | " | 2-hydroxy-5-chlorophenyl-azo-2-hydroxy-1,4-dichloronaphthalene | navy blue |

TABLE 1-continued

| | I | II | III |
|---|---|---|---|
| 9 | [structure: 2-hydroxy-5-sulfo-phenyl–N=N–6-amino-naphthalene-sulfonic acid] | [structure: 2-hydroxyphenyl–N=N–(2-hydroxy-4-nitro)naphthalene] | grey |
| 10 | [structure: HO₃S, OH, Cl substituted phenyl–N=N–naphthol with NH₂ and SO₃H] | [structure: 2-hydroxy-4-nitrophenyl–N=N–C(OH)=C–C(CH₃)=N ring with N-phenyl] | brown |
| 11 | " | [structure: 2-hydroxy-4-nitrophenyl–N=N–2-hydroxynaphthyl] | grey |
| 12 | " | [structure: 2-hydroxy-5-nitrophenyl–N=N–2-hydroxynaphthyl] | navy blue |
| 13 | " | [structure: 2-hydroxy-4-nitrophenyl–N=N–(2-hydroxy-4-N,N-diethylamino)phenyl] | navy blue |
| 14 | [structure: nitro, SO₃H naphthol linked to amino-sulfo-hydroxynaphthalene via N=N] | " | navy blue |
| 15 | [structure: bis-naphthol with NH₂, SO₃H, OH, SO₃H linked] | [structure: 2-hydroxy-4-nitrophenyl–N=N–(2-hydroxy-4-N,N-diethylamino)phenyl] | navy blue |
| 16 | " | [structure: 2-hydroxy-4-nitrophenyl–N=N–(2-hydroxy-4-N,N-diethylamino)phenyl] | navy blue |

TABLE 1-continued
| | I | II | III |
|---|---|---|---|
| 17 | " | 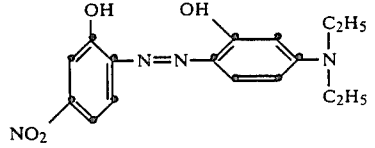 | navy blue |
| 18 | " | 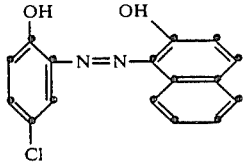 | navy blue |
| 19 | " | 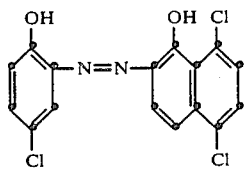 | navy blue |
| 20 | " | 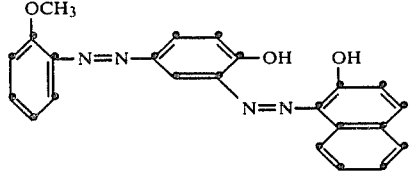 | grey |
| 21 | " | 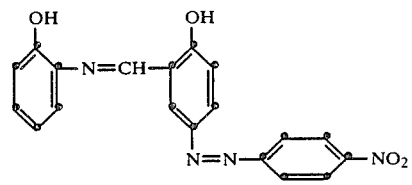 | brown |
| 22 | " | 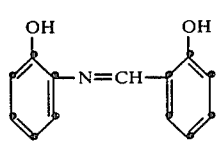 | olive drab |
| 23 | " | 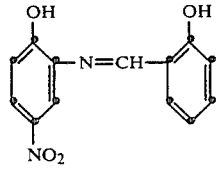 | olive |
| 24 | " | 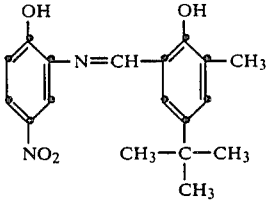 | olive |

TABLE 1-continued

| | I | II | III |
|---|---|---|---|
| 25 | " | [structure: 2-hydroxy-4-nitrophenyl azo coupled to dichloro-hydroxynaphthalene] | navy blue |
| 26 | [structure: disazo with OH, SO₃H, NH₂, NO₂ substituents on naphthalene system] | [structure: 2-hydroxy-4-nitrophenyl azo coupled to hydroxy-N,N-diethylamino phenyl] | navy blue |
| 27 | [structure: HO₃S, OH, NO₂ phenyl azo coupled to OH, SO₃H, NH₂ naphthalene] | [structure: 2-hydroxy-4-nitrophenyl azo coupled to pyrazolone with phenyl and CH₃] | brown |
| 28 | " | [structure: 2-hydroxy-4-nitrophenyl azo coupled to hydroxynaphthalene] | dark brown |
| 29 | [structure: HO₃S, OH, Cl phenyl azo coupled to OH, NH₂, SO₃H naphthalene] | [structure: 2-hydroxy-4-nitrophenyl azo coupled to hydroxy-N,N-diethylamino phenyl] | navy blue |
| 30 | [structure: HO₃S, OH, Cl phenyl azo coupled to OH, SO₃H, NH₂ naphthalene] | " | navy blue |
| 31 | [structure: HO₃S, OH, NO₂ phenyl azo coupled to OH, NH₂, HO₃S naphthalene] | [structure: phenyl azo coupled to dimethyl-dihydroxyphenyl azo pyrazole with phenyl] | corinth |
| 32 | " | [structure: phenyl azo coupled to hydroxyphenyl azo pyrazole with methyl and phenyl] | brown |

TABLE 1-continued

| | I | II | III |
|---|---|---|---|
| 33 | " | [structure: bis-phenol with N=CH linkage, NO2 and N=N-aryl groups] | olive |
| 34 | [structure: HO3S, OH, N=N, HO, NH2, Cl, HO3S substituted azo naphthalene] | [structure: OH, N=N, HO, pyrazole with CH3, N-aryl-Cl, NO2] | brown |
| 35 | [structure: HO3S, OH, N=N, HO, NH2, HO3S, NO2 substituted naphthalene azo] | [structure: O2N, OH, N=N, HO, pyrazolone N-H, CH3, Cl] | reddish grey |

Further fibre-reactive dyes are obtained by reacting the 1:1 chromium complexes of the monoazo compounds listed in column I of Table 2 with the metal-free azo compounds of column II, subsequently acylating the resultant 1:2 chromium complex with the reactive component listed in column III, and, finally, effecting condensation with 1 equivalent of the amino compound of column IV. The products dye cotton in the shades indicated in column V.

TABLE 2

| | I | II | III | IV | V |
|---|---|---|---|---|---|
| 36 | [structure: HO3S, OH, N=N, HO, NH2, HO3S, NO2] | [structure: OH, N=N, HO, N-aryl, CH3, NO2 pyrazole] | [structure: triazine with F, F, F] | H2N-aryl-SO3H | brown |
| 37 | " | " | [structure: CF3, pyrimidine with F, F, Cl] | — | brown |
| 38 | [structure: OH, N=N, HO, NH2, HO3S, SO3H] | " | [structure: triazine with Cl, Cl, Cl] | H2N-aryl-SO3H | brown |
| 39 | [structure: HO3S, OH, N=N, HO, NH2, HO3S, NO2] | " | " | H2N-aryl-SO3 | brown |

TABLE 2-continued

| | I | II | III | IV | V |
|---|---|---|---|---|---|
| 40 | 2-hydroxy-5-nitro-3-sulfo-phenyl azo 1-hydroxy-2-amino-6-sulfo-naphthyl | 2-hydroxy-5-nitrophenyl azo 2-hydroxynaphthyl | 2,4,6-trifluoro-triazine | 4-amino-benzenesulfonic acid | grey |
| 41 | 2-hydroxy-5-nitro-3-sulfo-phenyl azo 1-hydroxy-8-amino-4-sulfo-naphthyl | " | " | " | dark brown |
| 42 | 2-hydroxy-3-sulfo-phenyl azo 1-hydroxy-3-sulfo-6-amino-naphthyl | 2-hydroxy-4-nitrophenyl azo 3-(N,N-diethylamino)-6-hydroxyphenyl | " | " | navy blue |
| 43 | 2-hydroxy-5-nitro-3-sulfo-phenyl azo 1-hydroxy-3-sulfo-6-amino-naphthyl | " | 2,4,6-trichloro-triazine | " | navy blue |
| 44 | " | 2-methoxyphenyl azo 4-hydroxy-3-(2-hydroxynaphthyl-azo)phenyl | 2,4,6-trifluoro-triazine | " | grey |

Dyeing Procedure 1:

The following ingredients are dissolved in succession in 4000 parts of water of 50° C.: 4 parts of 80% acetic acid, 2 parts of the ammonium salt of the acid sulfuric acid ester of the adduct of a fatty amine (consisting of 30% of hexadecylamine, 25% of octadecylamine and 45% of octadecenylamine and 7 moles of ethylene oxide), and 4 parts of ammonium sulfate. Then 2 parts of the dye obtained in Example 1 are dissolved hot in 100 parts of water and added to this dyebath. Then 100 parts of prewetted woollen knitting yarn are put into the bath and the bath temperature is raised from 50° to 80° C. in the course of 30 minutes. After dyeing for 20 minutes at 80° C., the bath is heated to the boil and dyeing is subsequently carried out at the boil for 90 minutes. The dye exhausts almost completely onto the substrate. After the bath has been cooled to 80° C., the pH is raised from about 4.5 to a constant 8.5 by adding ammonia solution and the goods are given an aftertreatment for 20 minutes at this temperature. After a thorough rinsing with hot and cold water, acidifying with 1 part of 80% formic acid, centrifuging and drying, a reddish brown woollen yarn of very good wetfastness and fastness to rubbing and of excellent light-fastness is obtained.

Dyeing Procedure II:

2 Parts of the dye obtained in Example 36 are dissolved in 100 parts of water with the simultaneous addition of 0.5 part of sodium m-nitrobenzenesulfonate. A cotton fabric is impregnated with this solution to a liquor pick-up of 75% and then dried. The fabric is thereafter impregnated with a warm solution of 20° C. which contains, per liter, 5 g of sodium hydroxide and 300 g of sodium chloride, squeezed out to a pick-up of 75%, steamed for 30 seconds and 100° to 101° C., rinsed, soaped for a quater of an hour in a 0.3% boiling solution of a non-ionic detergent, rinsed again, and dried.

What is claimed is:

1. A chromium complex dye which, in the form of the free acid, has the formula

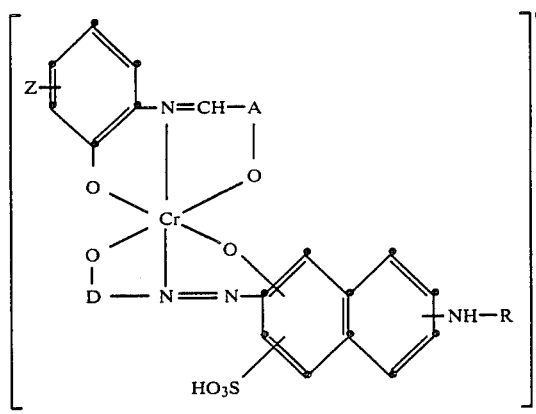

wherein Z is hydrogen, nitro, chlorine or naphthylazo or phenylazo, wherein naphthyl or phenyl is unsubstituted or substituted by nitro, chlorine, bromine, $C_{1-5}$-alkyl or $C_{1-5}$-alkoxy, A is naphthyl or phenyl containing the oxygen atom in o-position to the azomethine and wherein naphthyl or phenyl is unsubstituted or substituted by $C_{1-5}$-alkyl, halogen or naphthylazo or phenylazo wherein naphthyl or phenyl is unsubstituted or substituted by nitro, chlorine, bromine, $C_{1-5}$-alkyl or $C_{1-5}$-alkoxy, D is sulfophenyl which is unsubstituted or substituted by nitro or chlorine, or sulfonaphthyl which is unsubstituted or substituted by nitro, and is bonded to the azo group in the ortho-position to the oxygen atom and R is chloroacetyl, bromoacetyl, α-chloroacryloyl, α-bromoacryloyl, α,β-dichloropropionyl, α,β-dibromopropionyl, 5-chloro-2,4-difluoropyrimidyl or 2-chloro- or 2-fluorotriazin-6-yl substituted in the 4-position by amino, N-$C_{1-4}$-alkylamino, N,N-di-($C_{1-4}$-alkyl)-amino, phenylamino, monosulfophenylamino, disulfophenylamino, $C_{1-4}$-alkoxy, β-methoxyethoxy, phenoxy, monosulfophenoxy, disulfophenoxy, hydroxy, mercapto, $C_{1-4}$-alkylmercapto or phenylmercapto.

2. A chromium complex according to claim 1, wherein A is phenyl which is unsubstituted or substituted by halogen, $C_{1-5}$-alkyl, naphthylazo or phenylazo wherein phenyl is unsubstituted or substituted by nitro.

3. A chromium complex according to claim 1, wherein R is α,β-dibromopropionyl or α-bromoacryloyl.

* * * * *

UNITED STATES PATENT AND TRADEMARK OFFICE
CERTIFICATE OF CORRECTION

PATENT NO. : 4,544,739

DATED : October 1, 1985

INVENTOR(S) : Hans U. Schutz, Basel; Arthur Buhler, Rheinfelden

It is certified that error appears in the above-identified patent and that said Letters Patent is hereby corrected as shown below:

On the cover page, Item [62] should read--
Division of Ser. No. 196,423, Oct. 14, 1980, now
U.S. Patent 4,416,815 on November 22, 1983.

Signed and Sealed this

Eleventh Day of February 1986

[SEAL]

Attest:

DONALD J. QUIGG

Attesting Officer

Commissioner of Patents and Trademarks